Oct. 17, 1933.       R. C. KIRCH       1,930,977
CURRY-COMB
Filed Oct. 21, 1932

Ralph C. Kirch
Inventor

By C. A. Snow & Co.
Attorneys.

Patented Oct. 17, 1933

1,930,977

UNITED STATES PATENT OFFICE 1,930,977

CURRY-COMB

Ralph Charles Kirch, Keokuk, Iowa

Application October 21, 1932. Serial No. 638,962

1 Claim. (Cl. 119—94)

The present invention relates to curry-combs, the primary object of the invention being to provide a reversible curry-comb, so constructed that when one side of the curry-comb becomes clogged or unfit for use, the handle may be removed and repositioned in such a way that the opposite side of the curry-comb may be used.

The primary object of the invention is to provide a novel form of handle for the curry-comb, and capable of ready and easy reversal, the handle being removed and replaced, without the use of tools.

Referring to the drawing.

Figure 1:
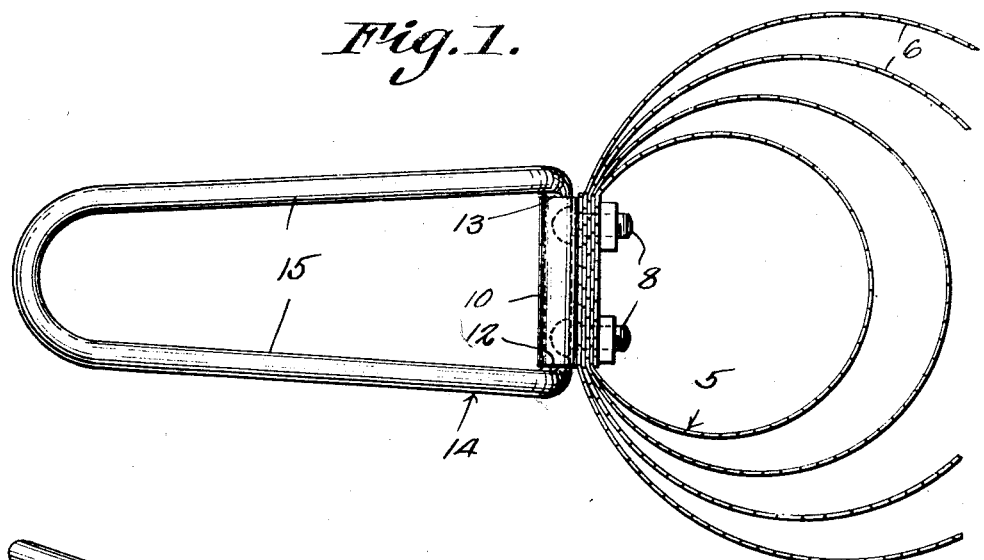
Figure 1 is a plan view of a curry-comb constructed in accordance with the invention.
Figure 2:
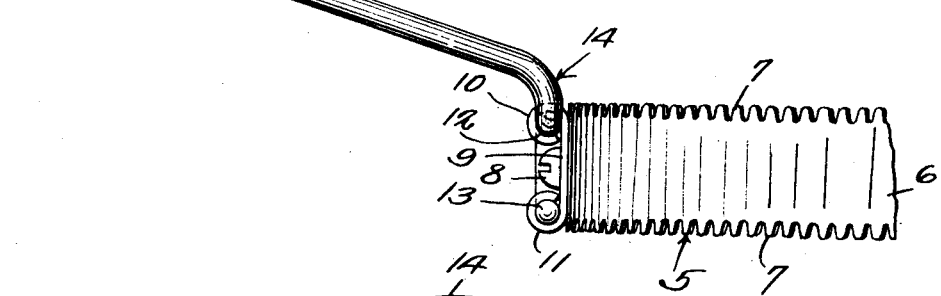
Figure 2 is a fragmental side elevational view thereof.

Referring to the drawing in detail, the body portion of the curry-comb is indicated generally by the reference character 5, and embodies a plurality of circular members 6 arranged one within the other, and spaced appreciable distances apart.

These members 6 are formed preferably of steel band material, the edges thereof being provided with teeth 7, constituting the teeth of the curry-comb.

Bolts indicated by the reference character 8, pass through openings formed in the members 6, securing the members 6 in position. Forming a part of the curry-comb, is a wide plate 9, which is provided with upper and lower tubular sections 10 and 11 respectively, open at their ends, to receive the right angled end portions 12 and 13 respectively of the handle 14.

The handle, which forms the essence of this invention, is formed preferably of a length of heavy wire material bent upon itself to provide leg members 15 which lie in spaced relation with each other providing a convenient handle to be grasped by the operator in using the curry-comb.

Figure 3:
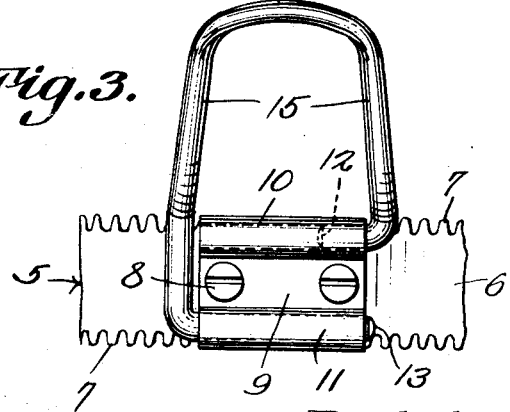
Figure 3 is a fragmental rear elevational view of the curry-comb.

As clearly shown by Figure 3 of the drawing, the leg member of which the right angled portion 12 forms a part, is shorter than the other leg member, with the result that when the handle is positioned adjacent to the body portion of the curry-comb, the right angled portion 13 will be in a position to pass into the left end of the lower tubular section 11, while the shorter right angled end 12, will lie in a position to be inserted in the upper tubular section, securely mounting the handle on the body portion of the comb.

Due to the fact the handle is constructed of wire material, the leg members may be readily spread apart to permit the right angled portions 12 and 13 to be removed, the right angled portions being held in position against accidental displacement, by the flexibility of the material of which the handle is formed.

From the foregoing it will be seen that due to the construction shown and described, when one side of the curry comb becomes clogged or otherwise unfit for use, the handle may be readily removed and reversed, bringing the opposite side of the curry-comb into use.

Having thus described the invention what is claimed is:

A reversible cleaning member comprising a body portion, a wide plate secured to the body portion, upper and lower tubular sections having open ends, forming a part of the plate and secured to the body portion, the upper and lower edges of the tubular sections lying in planes with the respective upper and lower edges of the body portion, a handle formed of a length of heavy wire material bent upon itself providing leg members, one of the leg members being longer than the other leg member, the free ends of the leg members being extended laterally in opposite directions and fitted within the tubular sections, the laterally extended ends of the leg members being removably mounted within the tubular sections whereby the handle may be readily reversed on the body portion.

RALPH CHARLES KIRCH.